United States Patent
Cummings et al.

(10) Patent No.: US 6,602,537 B1
(45) Date of Patent: Aug. 5, 2003

(54) COW MILK WITH ENHANCED NUTRITIVE AND HEALTH VALUES

(75) Inventors: Kenneth R. Cummings, Skillman, NJ (US); Donald L. Palmquist, Wooster, OH (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

(21) Appl. No.: 09/311,948

(22) Filed: May 14, 1999

(51) Int. Cl.$^7$ .................................. A23C 9/00
(52) U.S. Cl. ........................ 426/580; 426/648
(58) Field of Search ................. 426/2, 580, 648, 426/635, 807

(56) References Cited

U.S. PATENT DOCUMENTS

| | | | |
|---|---|---|---|
| 4,642,317 A | 2/1987 | Palmquist et al. | 511/558 |
| 4,729,896 A | 3/1988 | Sawhill | 426/2 |
| 4,826,694 A | 5/1989 | McAskie | 426/74 |
| 4,853,233 A | 8/1989 | McAskie | 426/74 |
| 4,909,138 A | 3/1990 | McAskie | 99/536 |
| 5,182,126 A | 1/1993 | Vinci et al. | 426/74 |
| 5,212,325 A | 5/1993 | Lajoie | 554/56 |
| 5,221,544 A | 6/1993 | Sweeney et al. | 426/72 |
| 5,236,723 A | 8/1993 | Lajoie et al. | 426/72 |
| 5,250,714 A | 10/1993 | Lajoie | 554/156 |
| 5,456,927 A | 10/1995 | Vinci et al. | 426/74 |
| 5,496,572 A | 3/1996 | Rudden | 426/74 |
| 5,547,686 A | 8/1996 | Jenkins | 426/2 |
| 5,585,134 A | 12/1996 | Cummings et al. | 426/30 |
| 5,670,191 A | 9/1997 | Cummings et al. | 426/2 |
| 5,770,247 A | 6/1998 | Satter et al. | 426/2 |

OTHER PUBLICATIONS

Donald L. Palmquist, "Why Is It Important To Know How Feeding Alters The Fatty Acid Content Of Milk?", Apr., 1998, Tri–State Dairy Nutrition Conference, pp. 65–77.

M–P, Lin, C.R. Staples, C.A. Sims, and S.F. O'Keefe, "Modification Of Fatty Acids In Milk By Feeding Calcium–Protected High Oleic Sunflower Oil"\", 1996, Journal Of Food Science—vol. 61, No. 1, pp. 24–27.

Jin Jiang, Lennart Bjoerck, Rangne Fonden and Margareta Emanuelson, "Occurrence Of Conjugated CIS–9, Trans–11–Octadecadienoic Acid In Bovine Milk: Effects Of Feed And Dietary Regimen", 1996, Journal of Diary Science vol. 79, No. 3, pp. 438–445.

Irma Salminen, Marja Muanen, Matti Jauhiainen, and Antti Aro, "Dietary Trans Fatty Acids Increase Conjugated Linoleic Acid Levels In Human Serum", J. Nutr. Biochem., 1998, vol. 9, Feb., pp. 93–98.

Miriam L. Kelly, Julie R. Berry, Debra A. Dwyer, J.M. Griinari, P. Yvan Chouinard, Michael E. Van Amburgh and Dale E. Bauman, "Dietary Fatty Acid Sources Affect Conjugated Linoleic Acid Concentrations In Milk From Lactating Dairy Cows", 1998, American Society for Nutritional Sciences, Nutrient Metabolism, pp. 881–885.

*Primary Examiner*—Arthur L. Corbin
(74) *Attorney, Agent, or Firm*—Stephen B. Shear

(57) ABSTRACT

A cow milk product with enhanced nutritional and health values for human consumption, obtained from cows fed with a feedstock having a supplement containing at least about 60 weight percent of calcium oleate, which product has milk fat with a profile of fat constituents including about 1–3.5 weight percent of conjugated linoleic acid, about 2–6 weight percent of trans-11 18:1 fatty acid, about 20–30 weight percent of cis-9 18:1 fatty acid, and about 30–38 weight percent of 14:0 and 16:0 fatty acid, per total milk fat, and wherein the 18:1 to 18:0 fatty acid ratio in the milk fat is about 2–3.2:1.

2 Claims, 4 Drawing Sheets

COW MILK WITH ENHANCED NUTRITIVE AND HEALTH VALUES

BACKGROUND OF THE INVENTION

This invention generally relates to feedstocks for lactating dairy cows which are nutrient-supplemented to provide milk with a modified fatty acid profile. More specifically this invention relates to the production of cow milk which has an increased content of conjugated linoleic acid (CLA).

Conjugated linoleic acid is a collective term for positional and structural isomers of linoleic acid. These isomers are combinations of delta-9,11 or delta-10,12, with each of the two double bonds having the possibility of being cis or trans. Thus, there are eight isomers with these specific combinations. The conjugated linoleic acid isomer with a cis double bond between carbon atoms 9 and 10, and a trans double bond between carbon atoms 11 and 12, is of particular interest for purposes of the present invention.

The nomenclature of fatty acids is simplified by referring to stearic acid as 18:0, oleic acid as cis-9 18:1, linoleic as cis-9, cis-12 18:2, and conjugated linoleic acid, for example, as cis-9, trans-I 11 18:2.

Over 400 different fatty acids have been identified in dairy cow milk fat, but only a limited number occur in concentrations greater than 1%. Typical fatty acid constituents of cow milk fat are listed as a percentage of total milk fat in TABLE I.

TABLE 1[(1)]

MILK FAT

| Fatty Acid | Percent |
| --- | --- |
| 4:0 | 4.95 |
| 6:0 | 3.00 |
| 8:0 | 1.65 |
| 10:0 | 3.61 |
| 12:0 | 3.96 |
| 14:0 | 11.38 |
| 14:1 | 1.03 |
| 15:0 | 1.11 |
| 16:0 | 30.96 |
| 16:1 | 1.59 |
| 18:0 | 11.05 |
| 18:1 (trans) | 1.88 |
| 18:1 (cis) | 19.33 |
| 18:2 | 2.69 |
| 18:3 | 0.37 |
| CLA | 0.46 |

[(1)]D. L. Palmquist, Tri-State Dairy Nutrition Conference, pages 65 . 77 (April 1998).

The effects of different feedstocks on the milk fat profile of cow milk has been extensively studied, and correlations have been established. One effect is that dietary fats increase the proportions of long-chain fatty acids in milk fat. By feeding supplemental fats with different relative amounts of 16 or 18 carbon fatty acids to lactating cows, the chain length of predominant fatty acids in milk fat can be influenced. For example, feeding a dietary fat containing a high proportion (50%) of 16:0 carbon fatty acid will increase 16:0 in milk fat. Similarly, feeding dietary 18:1 fatty acid will increase 18:1 fatty acid in milk fat.

Many dietary fats contain a large proportion of unsaturated fatty acids. Under the usual feeding conditions for lactating cows, however, these unsaturated fatty acids do not appear in cow milk because they are extensively biohydrogenated to more saturated fatty acids (e.g., stearic acid) by the ruminal microbial population.

Partial biohydrogenation yields various unsaturated isomers that can be absorbed and incorporated in milk fat. Two of the most important partially biohydrogenated isomers are trans-11 18:1 and cis-9, trans-11 18:2 (conjugated linoleic acid, CLA).

Traditionally, milk fat has been condemned as not being "heart healthy" because of its high content of cholesterol and saturated fatty acids. More recent investigations suggest that the cholesterol content is of relatively small concern and that only certain saturated fatty acids, i.e., lauric (12:0), myristic (14:0) and palmitic (16:0), consistently raise plasma cholesterol in susceptible people.

Recent research also has shown that there are numerous components of milk fat that are potential anticarcinogenic agents [J. Nutr., 127, 1055 (1997)]. These include CLA, sphingomeyelin, butyric acid, and ether lipids. CLA is of the greatest interest. This CLA isomer of linoleic acid, formed mainly as a product of the ruminal biohydrogenation process, is the most potent natural anticarcinogen in foods [Cancer (Suppl.),74, 1050 (1984)]. CLA occurs in milk fat in a quantity of about 0.3–0.8% of the total milk fat.

In addition to its anticarcinogenic effects, CLA has been reported to influence body composition (less fat, more muscle), improve bone growth, and stimulate immune function.

There is continuing interest in the development of new methods and feedstocks for producing dairy products that are healthier for human consumption.

SUMMARY OF INVENTION

Accordingly, it is an object of this invention to provide a dietary feedstock supplement for lactating dairy cows.

It is another object of this invention to provide a dietary ration for feeding lactating dairy cows, which will effect a beneficial modification of the fatty acid profile of the cow milk fat.

It is a further object of this invention to provide cow milk which has an elevated content of conjugated linoleic acid, and an increased ratio of 18:1 to 18:0 fatty acids.

Other objects and advantages of the present invention shall become apparent from accompanying description and example.

Of background interest, with respect to the present invention, are publications which describe dietary fat supplements for ruminants, which include U.S. Pat. Nos. 4,642,317; 4,729,896; 4,826,694; 4,853,233; 4,909,138; 5,182,126; 5,212,325; 5,221,544; 5,236,723; 5,250,714; 5,456,927; 5,496,572; 5,547,686; 5,585,134; 5,670,191; and publications cited therein; incorporated by reference.

Other publications of interest include J. Food Sci., 61 (No.1), 24 (1996) which describes the feeding of calcium salts of high oleic su nflower oil (HOS—Ca) to lactating cows to yield cow milk with an increased content of oleic acid.

DESCRIPTION OF THE INVENTION

Figure 1:
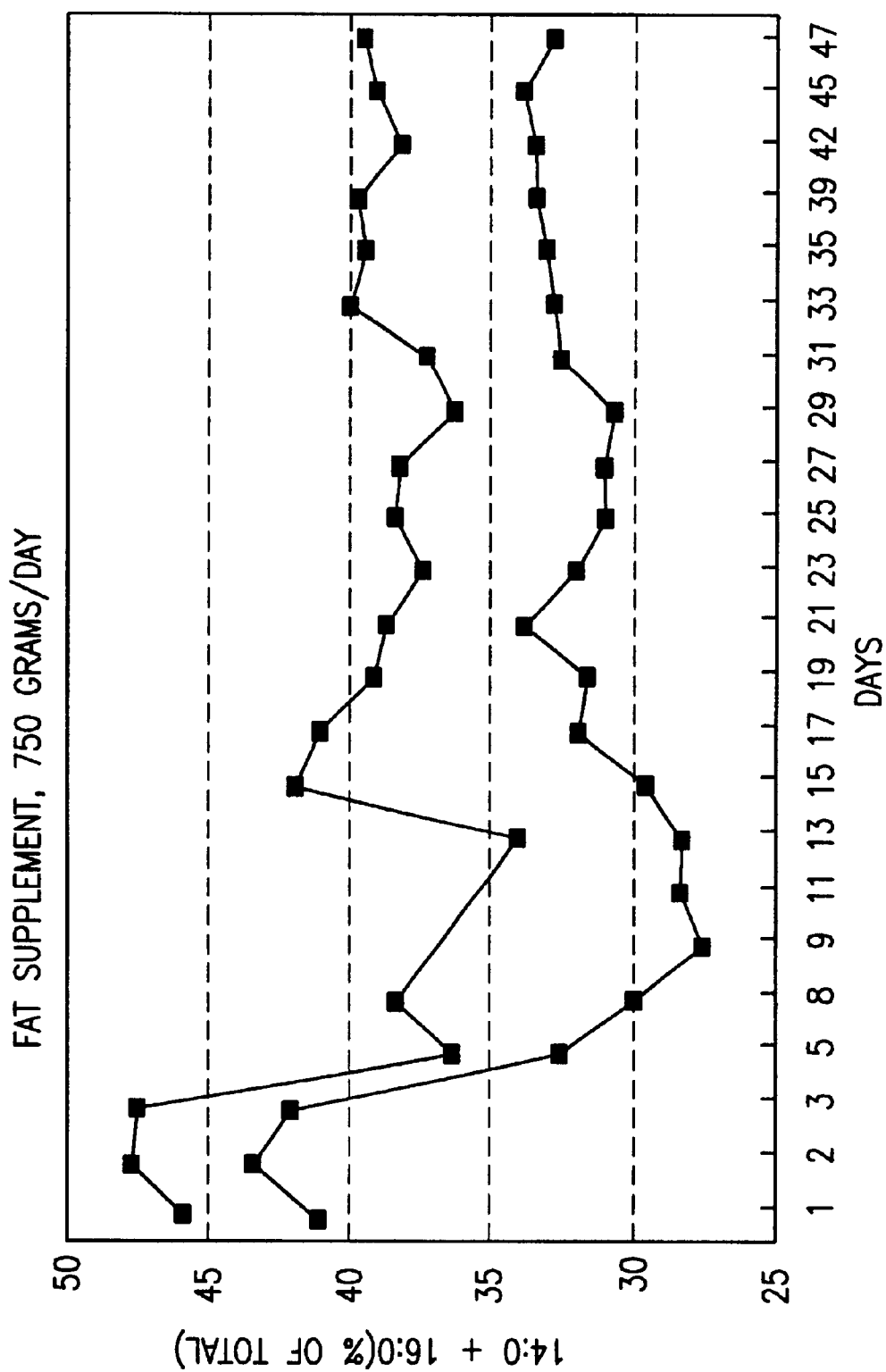
FIG. 1 is a graph illustrating the 14:0+16:0 fatty acid content of milk fat during a feed regimen of calcium oleate (fat supplement, 750 grams/day) to lactating cows in accordance with the example procedure.

One or more objects of the present invention are accomplished by the provision of a method of increasing the nutritive and health values of cow milk product for human consumption, which comprises feeding a lactating cow-with a feedstock having a supplement of fatty acid calcium salt, wherein the supplement has a content of at least about 60 weight percent of calcium oleate; and wherein the supplement is at a sufficient level in the feedstock and the feeding period is of sufficient duration to provide a collected milk product which has a milk fat profile comprising between about 1–3.5 weight percent of conjugated linoleic acid, between about 2–6 weight percent of trans-11 18:1 fatty acid, between about 20–30 weight percent of cis-9 18:1 fatty acid, and between about 30–38 weight percent of 14:0 and 16:0 fatty acid, per total milk fat, and wherein the 18:1 to 18:0 fatty acid ratio in the milk fat is between about 2–3.2:1.

The duration of the feeding period for a lactating cow is between about 2–35 weeks with a modified milk fat profile observed within several days of feed cycle commencement.

The quantity of fat supplement in the feedstock will vary depending on the type of basal feed composition, but typically will be in the range between about 0.2–5 weight percent. The feed regimen for a lactating cow is regulated to provide between about 300–900 grams per day of the fat supplement.

In another embodiment, this invention provides a fat supplement in which at least 75 weight percent comprises unsaturated 18-carbon fatty acids. TABLE II illustrates the fatty acid profile of a typical fat supplement in accordance with the present invention.

A feed stock for lactating cows will be varied over the lactation cycle. A typical feedstock will include silage, and energy concentrate and protein concentrate. A basal feedstock can comprise (6.4) corn silage (35% dry matter), (17) alfalfa silage (50% dry matter), (1) alfalfa hay, and (6.9) energy and (2.1) protein concentrate.

The compositions of an energy concentrate and a protein concentrate are illustrated in TABLE III.

One or more other ingredients can be incorporated in a present invention feedstock composition, such as biologically active derivatives.

TABLE II

| FAT SUPPLEMENT | |
|---|---|
| Fatty Acids | Weight, % |
| 14:0 | 2.20 |
| 14:1 | 0.53 |
| 15:0 | 0.20 |
| 16:0 | 4.68 |
| 16:1 | 4.33 |
| 17:0 | 0.22 |
| 18:0 | 0.86 |

TABLE II-continued

| FAT SUPPLEMENT | |
|---|---|
| Fatty Acids | Weight, % |
| 18:1 (trans) | 4.09 |
| 18:1 (cis) | 63.65 |
| 18:1 (unknown) | 4.06 |
| 18:2 | 9.11 |
| 18:3 | 0.35 |
| CLA | 0.82 |
| Unknown | 4.92 |

TABLE III

| | Weight, % |
|---|---|
| ENERGY CONCENTRATE | |
| Ground shelled corn | 56.87 |
| Ground ear corn | 34.50 |
| Molasses | 2.00 |
| Animal/vegetable fat | 1.00 |
| Minerals and vitamins | 5.63 |
| PROTEIN CONCENTRATE | |
| Soybean meal - 44% | 60.88 |
| Soybran hulls | 26.20 |
| Molasses | 1.00 |
| Fish meal | 3.90 |
| Animal/vegetable fat | 1.00 |
| Sodium bicarbonate | 3.90 |
| Magnesium oxide | 0.92 |

An optional biologically active ingredient can be included in a feedstock in an effective quantity between about 0.05–20 weight percent, based on the weight of feedstock. It can be selected from a broad variety of nutrients and medicaments, either as a single component or as a mixture of components, which are illustrated by the following listing of active species:

1. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition.

| Protein | 12.0% |
|---|---|
| Fat | 0.7% |
| Lactose | 60.0% |
| Phosphorus | 0.79% |
| Calcium | 0.874% |
| Ash | 9.7% |

Another source of carbohydrate is derived from the pulp and paper industry which produces large quantities of byproduct lignin sulfonates from wood during the sulfite pulping process. The carbohydrate byproduct is a constituent of the spent sulfite liquor.

2. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs and salts thereof.

3. vitamin ingredients either singly or in combination which include thiamine HCl, riboflavin, pyridoxine HCl, niacin, niacinamide, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, chlorine, silicon, vanadium, selenium, calcium, magnesium, sodium and potassium.

4. protein ingredients as obtained from sources such as dried blood or meat meal, dried and sterilized animal and poultry manure, fish meal, liquid or powdered egg, fish solubles, cell cream, soybean meal, cottonseed meal, canola meal, and the like.

Protein ingredients include non-protein nitrogen compounds such as urea, biuret, ammonium phosphate, and the like.

5. antioxidants as illustrated by butylated hydroxyanisole, butylated hydroxytoluene, tocopherol, tertiary-butylhydroquinone, propyl gallate, and ethoxyquin; and suitable preservatives include sodium sorbate, potassium sorbate, sodium benzoate, propionic acid, a-hydroxybutyric acid, and the like.

6. suspension stabilizing agents which preferably are selected from nonionic surfactants, hydrocolloids and cellulose ethers. These types of chemical agents are illustrated by polyethylene oxide condensates of phenols, C8–C22 alcohols and amines; ethylene oxide reaction products with fatty acid partial esters of hexitans; alkylarylpolyoxyethylene glycol phosphate esters; gum arabic; carob bean gum; tragacanth gum; ammonium, sodium, potassium and calcium alginates; glycol alginates; xanthan gum; potato agar; alkylcellulose; hydroxyalkylcellulose; carboxyalkylcellulose; and the like.

The feedstock initially is metabolized in the rumen of cattle and other ruminants. The rumen contains microorganisms, such as bacteria and protozoa, which break down complex compounds ingested by the animal via a fermentation process. Among the substances transformed by the microorganisms are unsaturated fatty acids. When a lactating ruminant ingests an unsaturated fatty acid such as oleic acid, at least a portion of the unsaturated acid is converted to a saturated fatty acid which is absorbed in the tissues and milk of the animal.

The conversion of unsaturated fatty acid to saturated fatty acid in the rumen is the result of a microbial enzymatic biohydrogenation reaction.

Extensive development effort has been directed to feed supplements for ruminants such as lactating cows, which exhibit "rumen-bypass" properties and which are capable of resisting ruminal transformation, i.e., the supplements are resistant to degradation in the rumens. Rumen-bypass feed supplements are exemplified by fatty acid calcium salts and fatty acid amides.

The present invention calcium oleate exhibits rumen-bypass capability, so that a major proportion is not transformed in the rumen, and is absorbed in the tissues and milk of a lactating cow. A minor proportion of the calcium oleate is converted by enzymatic activity to various biohydrogenation intermediates and byproducts, many of which are equilibrium inter-related.

The milk fat profile of fatty acids in a present invention milk product appears to be mediated by a series of related biochemical reactions, which essentially are influenced by the composition of the fatty acid calcium salt feed supplement, and its effect on the microbial population in the rumen.

(1) cis-9 18:1→18:0
    18:0→cis-9, 18:1
(2) cis-9, cis-12 18:2→cis-9, trans-11 18:2 (CLA)
    cis-9, trans-11 18:2→trans-11 18:1
    trans-11 18:1→18:0
    trans-11 18:1→cis-9, trans-11 18:2 (CLA)

The conversion of 18:0 to cis-9 18:1, and trans-11 18:1 to cis-9, trans-11 18:2, involves delta-9 desaturase enzyme in the animal's tissues.

In another embodiment, this invention provides a cow milk product with enhanced nutritional and health values for human consumption, which product has milk fat with a profile of fat constituents comprising between about 1–3.5 weight percent of conjugated linoleic acid, between about 2–6 weight percent of trans-11 18:1 fatty acid, between about 20–30 weight percent of cis-9 18:1 fatty acid, and between about 30–38 weight percent of 14:0 and 16:0 fatty acid, per total milk fat, and wherein the 18:1 to 18:0 fatty acid ratio in the milk fat is between about 2–3.2:1.

This invention further contemplates a method for providing nutritive and health benefits which comprises supplementing a diet regimen for human consumption with a milk product which is produced in accordance with the embodiments described herein.

The nutritional and health values of unsaturated fatty acids, such as conjugated linoleic and oleic acid in diets for human consumption, are described in publications which include U.S. Pat. No. 5,770,247; Cancer Res., 51, 6118 (1991); J. Dairy Sci., 79, 438 (1996); Proc. Cornell Nutr. Conf. Feed Manuf., pp. 208–216, Cornell Univ. (1997); J. Nutr. Biochem., 9, 93 (1998); and J. Nutr., 128, 881 (1998); incorporated by reference.

The following example is further illustrative of the present invention. The components and specific ingredients are presented as being typical, and various modifications can be derived in view of the foregoing disclosure within the scope of the invention.

EXAMPLE

Holstein cows in early to mid-lactation are fed in pairs with fat supplemented ration. The basal feedstock consists of haylage, corn silage and concentrate, and contains about 18% crude protein. The fat supplement is added to the mixed feed as a top-dress.

The basal feedstock is summarized in TABLE IV. Nominally, the daily ration per lactating cow consists of about 15 kilograms of corn silage/concentrate, 17 kilograms of alfalfa silage, 1.0 kilogram of alfalfa hay, and 0.75 kilogram of fat supplement (calcium salts of TABLE II fatty acids, mainly calcium oleate).

Milk samples are collected and analyzed for fatty acid content using standard procedures involving gas chromatography of methyl ester derivatives of the milk fat ingredients, as detailed in publications such as J. Agric. and Food Chem., 36, 1202 (1988).

TABLE IV

BASAL FEEDSTOCK[(2)]

| Ingredient (50% of diet DM) | Weight % |
|---|---|
| Ground Shelled Corn | 36.00 |
| Ground Ear Corn | 30.00 |
| Salt, trace-mineralized | 1.00 |
| Soybean meal (44%) | 25.00 |
| Sodium Bicarbonate | 2.50 |
| Dicalcium phosphate | 1.50 |
| Limestone, feeding grade | 0.60 |
| Magnesium Oxide | 0.50 |
| Selenium-90 (90.8 mg/lb) | 0.48 |
| Copper sulfate | 0.01 |
| Zinc-73 | 0.01 |
| Vitamin A (30,000 IU/gm) | 0.05 |
| Vitamin D (3,000 IU/gm) | 0.15 |
| Vitamin E (20,000 IU/gm) | 0.20 |
| Pellet binder | 2.00 |

[(2)]Plus haylage and corn silage (50% of diet DM).

The effect of the calcium oleate fat supplement on the fatty acid profile of collected milk samples is summarized in graph form in FIGS. 1–4.

FIG. 1 illustrates the reduction of 14:0+16:0 fatty acids in the milk fat samples.

Figure 2:
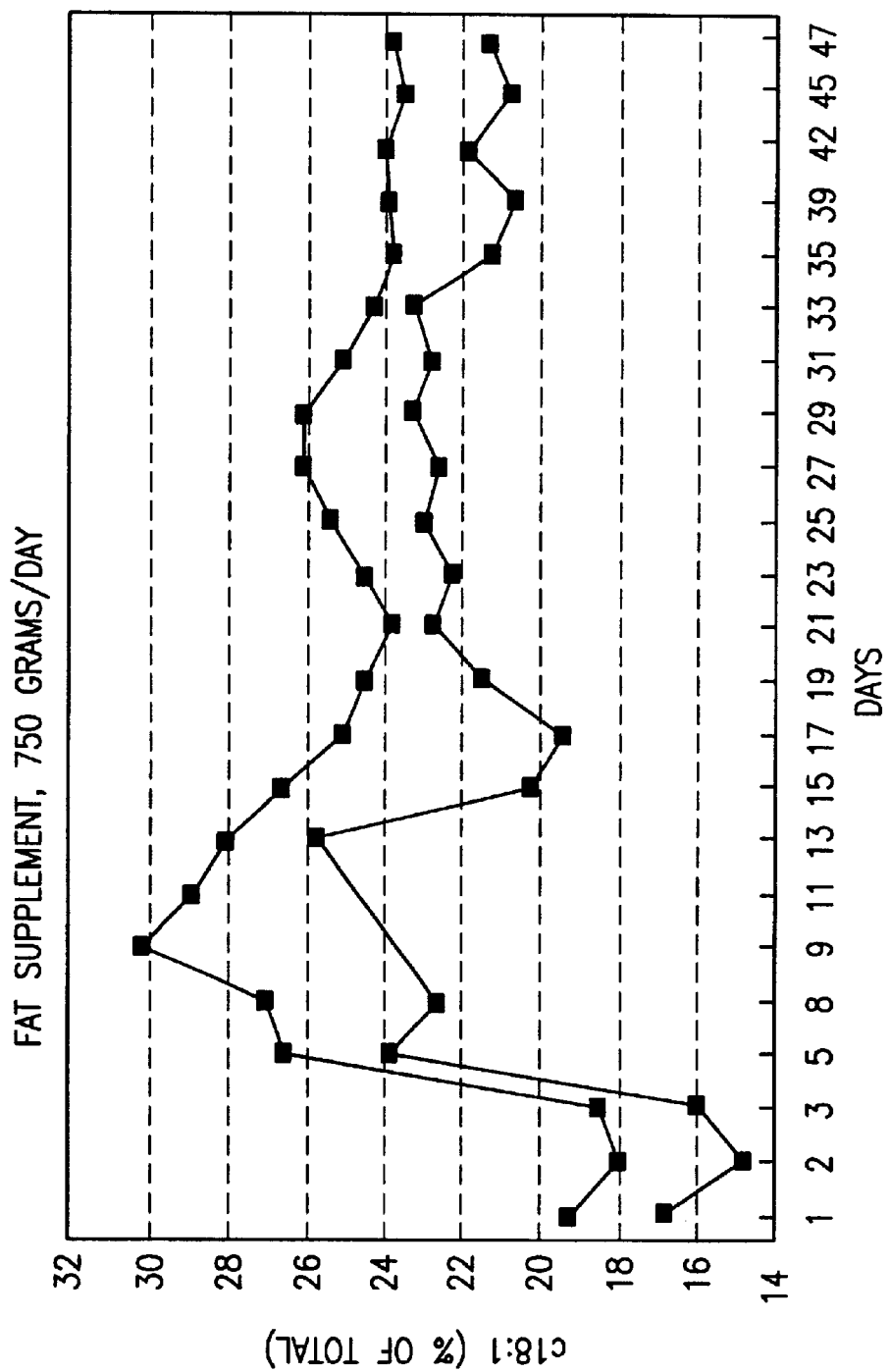
FIG. 2 is a graph illustrating the cis-9 18:1 (oleic acid) content of milk fat during a feed regimen of calcium oleate (fat supplement, 750 grams/day) to lactating cows in accordance with the example procedure.

FIG. 2 illustrates the increase of cis-9 18:1 fatty acid in the milk fat samples.

Figure 3:
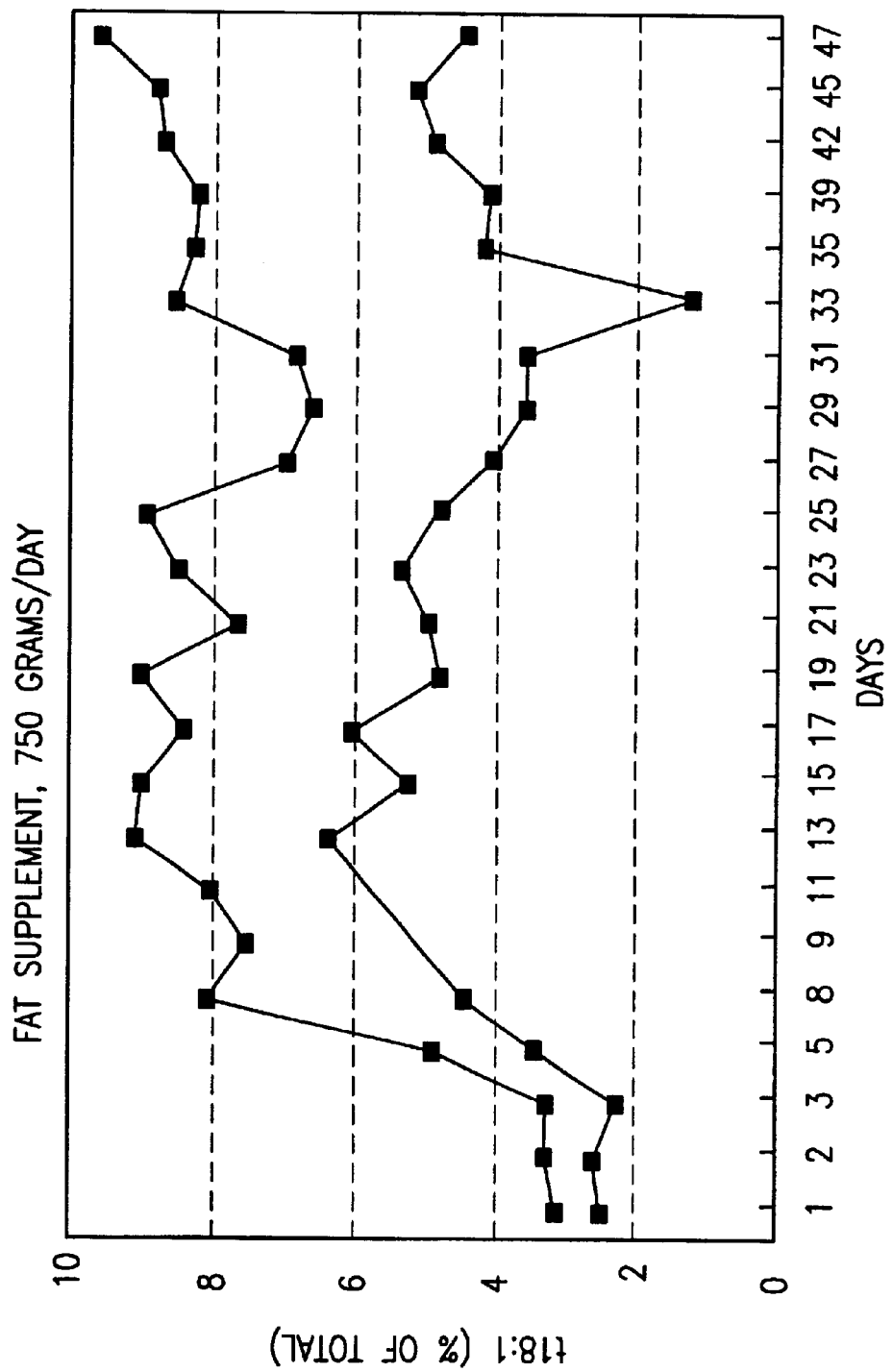
FIG. 3 is a graph illustrating the trans-11 18:1 fatty acid content of milk fat during a feed regimen of calcium oleate (fat supplement, 750 grams/day) to lactating cows in accordance with the example procedure.

FIG. 3 illustrates the increase of trans-11 18:1 fatty acid in the milk fat samples.

Figure 4:
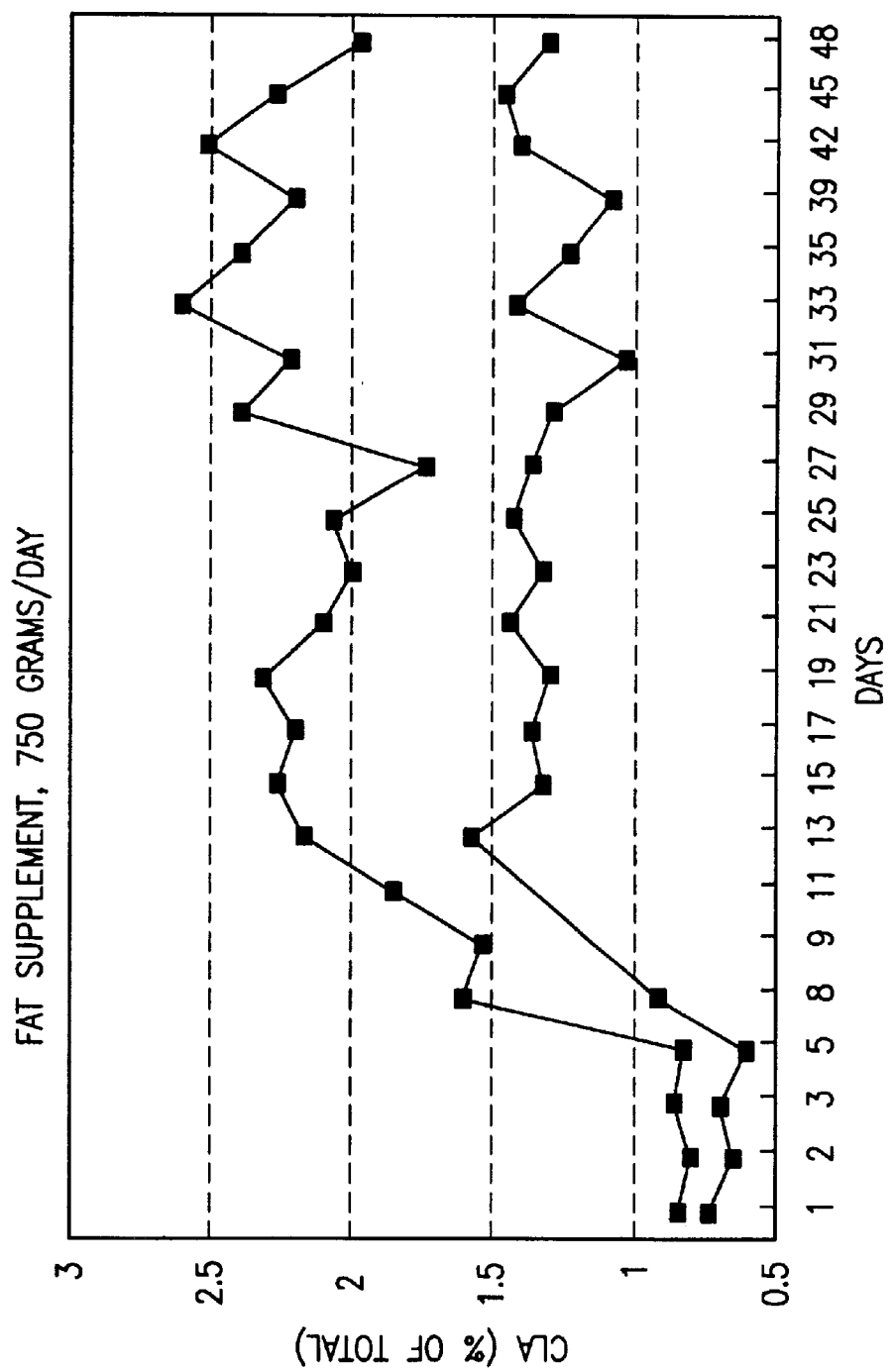
FIG. 4 is a graph illustrating the cis-9, trans-11 18:2 (conjugated linoleic acid, CLA) content of milk fat during a feed regimen of calcium oleate (fat supplement, 750 grams/day) to lactating cows in accordance with the example procedure.

FIG. 4 illustrates the increase in cis-9, trans-11 18:2 (conjugated linoleic acid, CLA) in the milk fat samples.

The test data also indicate that the milk fat samples have an 18:1 to 18:0 fatty acid ratio between about 2–3.2:1.

In an important aspect, the present invention demonstrates that ruminant feedstock with a calcium oleate supplement can increase the conjugated linoleic acid content of milk collected from lactating cows.

What is claimed is:

1. A cow milk product with enhanced nutritional and health values for human consumption obtained from cows fed with a feedstock having a supplement of fatty acid calcium salt, wherein the supplement has a content of at least about 60 weight percent of calcium oleate, which product has milk fat with a profile of fat constituents comprising about 1–3.5 weight percent of conjugated linoleic acid, about 2–6 weight percent of trans-11 18:1 fatty acid, about 20–30 weight percent of cis-9 18:1 fatty acid, and about 30–38 weight percent of 14:0 and 16:0 fatty acid, per total milk fat, and wherein the 18:1 to 18:0 fatty acid ratio in the milk fat is about 2–3.2:1.

2. A method for providing nutritive and health benefits which comprises supplementing a diet regimen for human consumption with a milk product in accordance with claim 1.

* * * * *